Patented Sept. 28, 1954

2,690,430

UNITED STATES PATENT OFFICE 2,690,430

METHOD OF PRODUCING A FLUORIDE-CONTAINING COMPOSITION

Raymond J. Anderson, Midland, Mich., assignor to The Dow Chemical Company, Midland, Mich., a corporation of Delaware No Drawing. Application November 16, 1949, Serial No. 127,770

17 Claims. (Cl. 252—175)

This invention relates to a method of preparing certain new inorganic fluoride-containing chemical products. It also concerns the products so made and some of their uses.

In recent years the commercial demand for water-soluble inorganic fluorides has been growing rapidly. For example, a number of smaller cities have started adding about one part per million of sodium fluoride to the public drinking water supply because of its known value in reducing tooth decay. Potassium fluoride is being used as a fluorinating agent for organic compounds on an increasing scale. Lithium fluoride has become an ingredient of welding fluxes, and related fluorides are also finding new uses.

The supply of these fluorides has been limited, and the price high, because they are prepared almost entirely in connection with hydrogen fluoride manufacture, a process which is itself expensive. If a sharp rise in demand for these fluorides were to occur, a serious supply problem would develop because hydrogen fluoride production capacity cannot rapidly be expanded.

The only fluoride available in large tonnage at a low price is the mineral fluorspar, or calcium fluoride. However, this material is difficult to use in water treatment because of its limited solubility and its low rate of solution. In addition, even when ground very fine, it sediments so fast that it is hard to mix into large volumes of water. In organic fluorinations and certain other chemical uses, calcium fluoride has too low a reactivity to be effective. For these reasons, calcium fluoride, per se, is incapable of filling much of the growing demand for inorganic fluorides.

It is therefore the principal object of the present invention to provide for treating calcium fluoride to convert its fluoride content to a form readily available for water treatment, organic fluorination, and the other uses mentioned.

This object is realized in the invention by heating calcium fluoride with a strongly alkaline metal hydroxide for a time sufficient to effect substantial reaction, and converting the resulting product to the finely-divided solid state. The reaction may be formulated as (1) 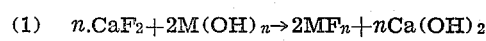

where M is a metal forming a strongly alkaline hydroxide and $n$ is the valence of the metal M, either 1 or 2. The resulting material, which is largely a mixture of metal fluoride and calcium hydroxide, may be used directly for water treatment, some organic fluorinations, and other purposes. In occasional instances, as in fluorinating compounds reactive with calcium hydroxide, it is desirable to heat the material to at least 600° C. to convert the calcium hydroxide present to calcium oxide.

The products of the invention are stable only when maintained dry. In the presence of moisture, or when added to water, they revert almost instantly to calcium fluoride and the initial alkaline hydroxide. However, the calcium fluoride so regenerated is in gelatinous form and will remain thus dispersed for a considerable period. Unlike crystalline calcium fluoride, the gelatinous material, when added to a further volume of water, dissolves very rapidly up to its solubility limit. Moreover, this limit is significantly higher than that of the crystalline compound, being about 40 parts per million. These properties allow the new materials of the invention to be used as water-treating agents by essentially the same simple techniques heretofore applicable only with sodium fluoride.

In using the new products in organic fluorinations, it is preferred to employ the form in which calcium oxide is the major calcium-containing reaction product, since it ordinarily remains inert. The products are therefore employed in conventional manner, allowance being made for the diluting effect of the inert material.

For purposes where a substantially pure water-soluble fluoride is required, it may be prepared by extracting a reaction product according to the invention with a non-aqueous selective solvent for the fluoride. Anhydrous lower alcohols are operable, especially methanol, ethylene glycol, and glycerol. Solubilities are somewhat higher in the polyhydric than in the monohydric alcohols.

In preparing the new products of the invention, the calcium fluoride may be from any convenient source. Natural fluorspar is usually satisfactory, though a better product is made with "acid" grade fluorspar purified by a flotation process. It is desirable that the calcium fluoride be finely ground, e. g. at least 80 per cent through an 80-mesh screen.

So far as known, any strongly alkaline metal hydroxide may be used for reaction with the calcium fluoride. Such hydroxides, as is known, are all soluble in boiling water to the extent of at least 10 per cent by weight. The alkali metal hydroxides, especially sodium, potassium, and lithium hydroxides, and the hydroxides of barium and strontium have all been found effective. The alkali metal hydroxides are preferred because of their greater reactivity. Sodium hydroxide is used when the product is to be employed in water treatment. Potassium hydroxide is distinctly superior when an organic fluorinating agent is to be formed.

The relative proportions of calcium fluoride and alkaline hydroxide are not critical, though for completeness of reaction it is preferable to use an amount of hydroxide at least molecularly equivalent to the fluoride, according to Equation 1 above. A slight excess of hydroxide, say 10 mol per cent, is helpful in insuring rapid interaction.

The reaction mixture according to the invention usually consists only of the calcium fluoride and the alkaline metal hydroxide, solid or in aqueous solution, together with the small proportions of impurities normal to these materials. However, inert diluents may be tolerated without disadvantage. Substantial proportions of carbonates and silicates should, however, be excluded, since these substances alter the course of the reaction.

In actual practice, the calcium fluoride and alkaline metal hydroxide are mixed together and then heated for a time sufficient to effect substantial interaction, preferably long enough to drive the reaction to completion. The hydroxide may be initially in finely-divided or flake solid form, and the process may be carried out entirely in the solid state or at a higher temperature with the hydroxide molten. Alternatively, the hydroxide may be employed as a concentrated aqueous solution, the reaction mixture being heated to drive off the water before completion of the process. In any case, after heating is terminated, the reaction product is converted to the finely-divided dry solid state, either by allowing it to cool in masses and breaking them up or by a flaking operation.

Interaction between calcium fluoride and the alkaline metal hydroxide has been found to take place at temperatures from about 75° C. to 800° C., with even higher temperatures, up to the boiling point, being thought operable. When it is desired that the final product contain calcium hydroxide as the major calcium-containing substance, reaction temperatures of 80° to 400° C. are most satisfactory. On the other hand, if calcium oxide is to be the major calcium-containing component, much higher temperatures, i. e. above 600° C., are required in at least the final stage of heating. Reaction rates are comparatively slow, with times of 0.5 hour even at the higher temperatures up to several days at the lowest operable temperatures being usually required. At 100° to 300° C., 2 to 20 hours ordinarily suffices.

When sodium hydroxide is the reactant for treatment of the calcium fluoride, the process is best carried out at temperatures of 80° C. to 160° C. At higher temperatures, e. g. at 250° C., especially when sodium hydroxide is present in molecular excess, there is less sodium fluoride in the product and, in addition to calcium hydroxide, a significant proportion of another solid phase which is not formed appreciably in the preferred temperature range. This phase exhibits an X-ray diffraction pattern similar to that of calcium oxide but with larger lattice parameters. It is believed to be a double compound or solid solution of sodium hydroxide or possibly sodium oxide with calcium oxide. In any event, the formation of this phase withdraws part of the sodium hydroxide from the possibility of reaction with the calcium fluoride, lowering the conversion to the desired sodium fluoride.

Optimum results in the use of sodium hydroxide are obtained by reacting the calcium fluoride with a concentrated aqueous solution of the hydroxide at about its boiling point. For example, aqueous caustic soda solutions containing 40 to 50 per cent NaOH by weight and boiling at 130° to 145° C. are very convenient. At these temperatures reaction proceeds fairly rapidly, usually in 1.0 hour or less, with a distinctly apparent change in the physical character of the mixture. The treatment may then be completed at about 160° C. Heating of the caustic soda solution-calcium fluoride mixture is ordinarily continued only long enough to evaporate the water present and to give a sensibly dry and friable material as final product ready for packaging in moisture-proof containers. If a calcium hydroxide-free material is required, this final product may be ignited at 600° to 800° C. until evolution of water ceases.

When potassium hydroxide is the reactant for treating calcium fluoride, higher temperatures are preferred than in the case of sodium hydroxide. The reaction proceeds at acceptable rates at temperatures above 120° C., but even up to 285° C. some potassium hydroxide remains unconsumed. Temperatures above 300° C. are required to insure absence of potassium hydroxide from the product. Unlike sodium hydroxide, no formation of calcium oxide solid solutions or double compounds has been found at any temperature. On the other hand, a part of the potassium fluoride formed tends to combine with unreacted calcium fluoride to form the double salt $KCaF_3$ which is relatively insoluble in non-aqueous selective solvents for potassium fluoride and is of little effectiveness in organic fluorinations. This tendency seems less pronounced as temperatures above 250° C. are used. The potassium hydroxide-calcium fluoride reaction product is somewhat pasty in the range of 420° to 620° C. and is liquid above 620° to 650° C.

Optimum reaction conditions for potassium hydroxide call for heating at 250° to 400° C. If desired, ignition of the calcium hydroxide in the final product to convert it to calcium oxide can be carried out as with the sodium hydroxide reaction product, but higher temperatures, approaching 800° C., and longer times are desirable.

The calcium fluoride-alkaline metal hydroxide reaction products of the invention are, as previously mentioned, well suited to use in adding fluoride to potable water supplies. The friable product made using aqueous sodium-hydroxide at 130° to 145° C. is preferred because of its lower cost and lower hygroscopicity. In practice, the reaction product is simply dispersed throughout the water being treated in a proportion just sufficient to produce the desired fluoride concentration. For instance, for a fluoride concentration of two parts F per million by weight, about the highest value permissible in controlling tooth decay, roughly eight parts per million of the sodium fluoride-calcium hydroxide mixture produced from fluorspar and sodium hydroxide should be added. At this concentration, reversion of the added product to form calcium fluoride is instant and complete, and the entire reversion product stays fully dissolved in the water.

In waterworks practice, it is preferable, for accurate control of fluoride concentration, to form a liquid preconcentrate and add this into the main stream of water. To this end, the fluoride-containing product of the invention, in a finely divided state, is mixed with water in a proportion far exceeding the solubility limit, thereby producing an aqueous suspension of gelatinous calcium fluoride. The proportion of material added may be as high as is consistent with making a readily flowable suspension, and is conveniently at least 0.1 per cent by weight. The preconcentrate is then mixed into the main stream of potable water in such proportion that the concentration of fluoride does not exceed two parts per million. Best results are obtained when the preconcentrate is made up continuously just before use and is mixed into the main body of water while the calcium fluoride is still in the gelatinous non-settling stage. To this end the mixing may take place within ten minutes of the preparation of the preconcentrate.

Conveniently, the preconcentrate is formed in a slurry tank provided with an agitator, to which water and the product of the invention are added in controlled proportions by mechanical means. The resulting suspension is then mixed into the main stream of potable water by conventional liquid dosing equipment.

The following examples, which are but a small fraction of the experimental evidence supporting the foregoing generalizations, will further illustrate the invention.

Example 1

Sodium hydroxide was reacted with acid grade fluorspar ground to a fineness of 80 per cent through an 80-mesh screen and 48 per cent through a 200-mesh screen. A charge of 78 parts by weight of the fluorspar (1.0 mol) was mixed with 176 parts of 50 per cent by weight aqueous sodium hydroxide (2.2 mols). The mixture was heated for 24 hours at 80° C. until a dry friable material resulted. On semi-quantitative analysis by X-ray diffraction methods, the product was found to contain about 50 per cent by weight of sodium fluoride, 40 per cent calcium hydroxide, and 10 per cent unreacted fluorspar.

Example 2

Ground fluorspar as in Example 1 was mixed with 200 mol per cent of 75 per cent aqueous sodium hydroxide and heated at 135° C. for 1.5 hours. The analysis of the friable solid product was similar to that in Example 1 except that a small proportion of the calcium oxide-sodium hydroxide solid solution phase was also formed.

Example 3

A mixture of ground fluorspar as in Example 1 (1.0 gram mol) and flake sodium hydroxide (2.0 gram mols) was heated at 800° C. for 1.0 hour. The product, in the form of easily crushed lumps, was found by X-ray analysis to contain about 50 per cent sodium fluoride and 50 per cent calcium oxide.

Example 4

Ground fluorspar as in Example 1 (78 parts by weight; 1.0 mol) was mixed with flake potassium hydroxide (112 parts; 2.0 mols) and 30 parts of water. This mixture was stirred at 150° to 190° C. for 0.25 hour to produce a smooth slurry. Heating was then continued for 2.0 hours at 250° C. to form a dry solid, easily crushed. On X-ray analysis, this product was found to contain high proportions of potassium fluoride and calcium hydroxide and very small proportions of calcium fluoride and potassium calcium fluoride ($KCaF_3$).

Example 5

The product of Example 4 was heated at 700° C. for 5.0 hours and at 800° C. for 1 hour. X-ray analysis of the final material showed about 50 per cent of potassium fluoride, about 40 per cent of calcium oxide, and about 10 per cent of potassium calcium fluoride.

Example 6

An equimolecular mixture of fluorspar and solid lithium hydroxide ($LiOH \cdot H_2O$) was heated at 300° C. for 1.0 hour. The product contained 20 per cent lithium fluoride, 25 per cent calcium hydroxide, 30 per cent unreacted fluorspar, 10 per cent unreacted lithium hydroxide, and 15 per cent lithium carbonate, the latter apparently formed by reaction with carbon dioxide in the air. When a portion of this product was heated at 600° C. for 2.0 hours, the resulting material contained only lithium fluoride, calcium oxide, and some calcium fluoride.

Example 7

An equimolecular mixture of fluorspar and barium hydroxide ($Ba(OH)_2 \cdot 8H_2O$) was heated at 100° C. for 1.0 hour and then at 300° C. for 2.0 hours. The product contained 65 to 70 per cent barium fluoride, the remainder being unreacted fluorspar, calcium hydroxide, and about 10 per cent of another phase unidentified in the X-ray diffraction method used.

Example 8

An equimolecular mixture of fluorspar and strontium hydroxide ($Sr(OH_2 \cdot 8H_2O$) was heated 2.0 hours at 300° C., 0.5 hour at 400° C., and then 1.0 hour at 500° C. The resulting material, by X-ray analysis, contained 55 per cent strontium fluoride, the remainder being calcium hydroxide, calcium oxide, and unreacted fluorspar.

Example 9

In a water treatment process, a preconcentrate was formed by stirring 2.06 parts by weight of the product of Example 1 into 100 parts of water. The resulting slurry, containing gelatinous calcium fluoride, was stirred, within three minutes of its preparation, into additional water in the ratio of 1 part by volume of slurry to 5,000 parts of water. The resulting treated water was then passed through a fine filter (No. 40 grade) to remove any solids present. The filtrate was found by analysis to contain 1.2 parts of fluoride (F) per million. The initial water contained no fluoride detectable by analysis.

Example 10

An organic fluorination was carried out using a portion of the product of Example 5. A charge of 172 grams of this material (containing the equivalent of 116 grams of potassium fluoride) was mixed with 366 grams of ethyl monochloroacetate and heated in a closed steel autoclave at 243° C. for 5.0 hours. The resulting organic material was separated into its components by rectification. There was obtained as the main fraction 102 cubic centimeters of a material boiling at 115° to 122° C., which was found to be ethyl monofluoroacetate. The yield of this product, based on the potassium fluoride equivalent charged, was about 50 per cent. The inorganic residue by X-ray analysis contained 60 per cent potassium chloride, 30 per cent calcium oxide and 10 per cent calcium fluoride.

Example 11

Another organic fluorination was carried out using a part of the product of Example 5. A charge of 43 grams of the product was mixed with 70.2 grams of benzoyl chloride and heated under reflux at 180° C. for 2.5 hours and then at 190° C. for an additional hour. The reaction mixture was then separated into its components by rectification. The main fraction was 25 cubic centimeters of a liquid boiling at 154° to 160° C. (mostly at 156° to 157° C.), which was found to be benzoyl fluoride. The yield, based on potassium fluoride charged, was about 45 per cent.

Example 12

A 33.3 gram portion of the product of Example 5 was extracted with 208 grams of anhydrous methanol at 60° C. for 2.0 hours, and the extract was filtered. The residue, by X-ray analysis, was found to contain 40 per cent potassium calcium fluoride, 40 per cent calcium oxide, and 20 per cent calcium hydroxide. From the filtrate there was recovered, by evaporation of the methanol, 12.8 grams of solid potassium fluoride of good purity.

I claim:

1. A method of producing a useful fluoride-containing product which comprises heating calcium fluoride with aqueous sodium hydroxide in at least a molecularly equivalent proportion in the absence of carbonates and silicates at a temperature of 80° to 160° C. for a time sufficient to convert at least a major part of the calcium fluoride to sodium fluoride, and vaporizing water from the resulting mixture at a temperature within the said range until it is converted to a dry, friable solid.

2. A method according to claim 1 wherein the final product is heated at a temperature of 600° to 800° C. to convert calcium hydroxide therein to calcium oxide.

3. A method of producing a useful fluoride-containing product which comprises heating calcium fluoride with at least a substantial proportion of a strongly alkaline metal hydroxide soluble in boiling water to the extent of at least 10 per cent by weight at a temperature between about 75° C. and the boiling point of the reactants and products for a time sufficient to effect substantial reaction between the calcium fluoride and the alkaline hydroxide and to dry the reaction product, such heating being carried out in the substantial absence of silicates and carbonates.

4. A method of producing a useful fluoride-containing product which comprises heating calcium fluoride with at least a molecularly equivalent proportion of a substance selected from the class consisting of the hydroxide of sodium, potassium, lithium, barium, and strontium at a temperature between 75° and 800° C. for a time of at least 0.5 hour sufficient to effect substantial reaction between the calcium fluoride and the hydroxide and to dry the reaction product, such heating being carried out in the substantial absence of carbonates and silicates.

5. A method according to claim 4 wherein the heating is carried out at a temperature of 80° to 400° C. for a time sufficient to form a product comprising calcium hydroxide as the principal calcium-containing reaction product.

6. A method according to claim 4 wherein the reaction mass is heated to a temperature of at least 600° C. for a time sufficient to form a product comprising calcium oxide as the principal calcium-containing reaction product.

7. A method of producing a useful fluoride-containing product which comprises heating calcium fluoride with at least a molecularly equivalent proportion of an alkali metal hydroxide at a temperature of at least 75° C. for a time sufficient to convert at least a major part of the calcium fluoride to alkali metal fluoride and to dry the reaction product, such heating being carried out in the substantial absence of carbonates and silicates.

8. A process which consists in extracting the product of the method of claim 7 with an anhydrous lower alcohol and heating the extract to vaporize the alcohol.

9. A method of producing a useful fluoride-containing product which comprises heating calcium fluoride with at least a molecularly equivalent proportion of sodium hydroxide at a temperature between 80° and 160° C. for a time sufficient to convert at least a major part of the calcium fluoride to sodium fluoride and to dry the reaction product, such heating being carried out in the substantial absence of carbonates and silicates.

10. A process according to claim 9 wherein the reaction product is ignited at 600° to 800° C. until evolution of water ceases.

11. A process of producing a useful fluoride-containing product which comprises heating calcium fluoride with at least a molecularly equivalent proportion of potassium hydroxide at a temperature between 250° and 400° C. for a time sufficient to convert at least a major part of the calcium fluoride to potassium fluoride and to dry the reaction product, such heating being carried out in the substantial absence of carbonates and silicates.

12. A method of producing a useful fluoride-containing product which comprises heating calcium fluoride, with at least a molecularly equivalent proportion of lithium hydroxide at a temperature of at least 75° C. for a time sufficient to convert at least a major part of the calcium fluoride to lithium fluoride and to dry the reaction product, such heating being carried out in the substantial absence of carbonates and silicates.

13. A method of producing a useful fluoride-containing product which comprises heating calcium fluoride with at least a molecularly equivalent proportion of barium hydroxide at a temperature between 75° and 800° C. for a time of at least 0.5 hour sufficient to effect substantial reaction between the calcium fluoride and the barium hydroxide and to dry the reaction product, such heating being carried out in the substantial absence of silicates and carbonates.

14. A method of producing a useful fluoride-containing product which comprises heating calcium fluoride with at least a molecularly equivalent proportion of strontium hydroxide at a temperature between 75° and 800° C. for a time of at least 0.5 hour sufficient to effect substantial reaction between the calcium fluoride and the strontium hydroxide and to dry the reaction product, such heating being carried out in the substantial absence of silicates and carbonates.

15. As a new composition of matter, a finely-divided dry solid mixture consisting essentially of calcium hydroxide and a substance of the class consisting of the fluorides of sodium, potassium, lithium, barium and strontium, and being the reaction product obtained by heating a mixture of a substance selected from the class consisting of the hydroxides of sodium, potassium, lithium, barium and strontium with an approximately molecularly equivalent proportion of calcium fluoride at a temperature of 80° to 400° C. for a time of at least 0.5 hour sufficient to effect substantial reaction between the calcium fluoride and the hydroxide and to dry the reaction product, such heating being carried out in the substantial absence of carbonates and silicates.

16. A composition according to claim 15 in which the fluoride is sodium fluoride, the heating having been carried out at a temperature of 80° to 160° C.

17. A composition according to claim 15 in which the fluoride is potassium fluoride, the heating having been carried out at a temperature of 250° to 400° C.

References Cited in the file of this patent

UNITED STATES PATENTS

| Number | Name | Date |
|---|---|---|
| 1,613,656 | Hall | Jan. 11, 1927 |
| 1,722,137 | Frischer | July 23, 1929 |

OTHER REFERENCES

Corrosion—Causes and Prevention; Speller; McGraw-Hill Co., N. Y. (1926); pages 344 and 347.

Comp. Treatise on Inorganic and Theoretical Chem.; Mellor; vol. 3 (1922); page 694.

Inorganic Chemistry; Ephraim; 4th ed. (1943); page 258.

Inorganic Chemistry; Partington (1926); pages 844-5.

Berzelius: "Lehrbuch Chemie," Dresden (1825); vol. II, part II, page 639.

Handbuch der Anorganischen Chemie; Gmelin-Kraut; Heidelberg (1909); vol. II, part II, pages 250-1.

Berthier: Ann. Chim. Phys. (2) 38 (1828); pages 253-4.